United States Patent
Underwood et al.

(10) Patent No.: US 10,077,570 B2
(45) Date of Patent: Sep. 18, 2018

(54) LANE LINE TENSIONING APPARATUS

(71) Applicant: Competitor Swim Products, Inc., Columbus, OH (US)

(72) Inventors: Bradford J. Underwood, Columbus, OH (US); Christos Ragias, Columbus, OH (US); Jason C. Diwik, Columbus, OH (US); Nick Vallo, Columbus, OH (US); Bret A. Gould, Columbus, OH (US)

(73) Assignee: Competitor Swim Products, Inc., Columbus, OH (US)

( * ) Notice: Subject to any disclaimer, the term of this patent is extended or adjusted under 35 U.S.C. 154(b) by 42 days.

(21) Appl. No.: 15/425,571

(22) Filed: Feb. 6, 2017

(65) Prior Publication Data

US 2018/0187441 A1    Jul. 5, 2018

Related U.S. Application Data

(63) Continuation-in-part of application No. 29/589,189, filed on Dec. 29, 2016, now Pat. No. Des. 813,613.

(51) Int. Cl.
*B60P 7/08* (2006.01)
*E04H 4/14* (2006.01)
*F16M 13/02* (2006.01)

(52) U.S. Cl.
CPC ............ *E04H 4/143* (2013.01); *B60P 7/0861* (2013.01); *F16M 13/02* (2013.01); *B60P 7/083* (2013.01)

(58) Field of Classification Search
CPC ....... B60P 7/0861; B60P 7/0823; B60P 7/083; Y10T 24/2175; E04H 4/143
See application file for complete search history.

(56) References Cited

U.S. PATENT DOCUMENTS

| | | | | |
|---|---|---|---|---|
| 310,845 | A | * 1/1885 | Overbagh | G01L 5/06 254/213 |
| 942,006 | A | * 11/1909 | Morehead | B60P 7/0861 254/223 |
| 4,542,883 | A | * 9/1985 | Rutzki | B60P 7/083 140/123.5 |
| 4,682,760 | A | 7/1987 | Baumgarten | |
| 4,961,544 | A | 10/1990 | Bidoia | |
| 5,101,735 | A | * 4/1992 | Williams | E01B 25/18 104/117 |
| 5,201,236 | A | 4/1993 | Nagano | |
| 5,271,606 | A | 12/1993 | Kamper | |

(Continued)

FOREIGN PATENT DOCUMENTS

| EP | 0260980 A2 | 3/1988 |
|---|---|---|
| EP | 1669268 A1 | 6/2006 |

(Continued)

*Primary Examiner* — Michael E Gallion
(74) *Attorney, Agent, or Firm* — Standley Law Group LLP

(57) ABSTRACT

A line tensioning device for adjusting and maintaining consistent tension in an anchored line has a ratchet assembly and a tension indicator assembly. The tension indicator assembly secures the device to an anchoring point and permits linear movement of the ratchet assembly between the line and the anchoring point. The tension indicator assembly includes a compressed spring and a plunger with a tension indicator mark visible externally from a plunger housing above a predetermined tension force threshold.

17 Claims, 12 Drawing Sheets

(56) References Cited

U.S. PATENT DOCUMENTS

| | | |
|---|---|---|
| 5,489,011 A | 2/1996 | Reed, Jr. et al. |
| 6,007,053 A | 12/1999 | Huang |
| 6,193,621 B1 | 2/2001 | McClosky |
| 6,279,415 B1 | 8/2001 | Chance et al. |
| 6,289,558 B1 | 9/2001 | Hammerslag |
| 6,439,552 B1 | 8/2002 | Ageishi et al. |
| 6,477,915 B1 | 11/2002 | Etxebarrena Allende |
| 6,524,041 B1 | 2/2003 | Voiculescu |
| 6,547,218 B2 * | 4/2003 | Landy ............... B60P 7/083 24/68 CD |
| 6,654,987 B1 | 12/2003 | Wu |
| D489,246 S | 5/2004 | Bolieu |
| D527,606 S | 9/2006 | Jackson |
| 7,360,753 B1 | 4/2008 | Lin |
| 7,509,711 B2 * | 3/2009 | Hsieh ............... F16G 11/12 24/68 CD |
| 7,712,193 B2 | 5/2010 | Mohtasham et al. |
| D642,031 S | 7/2011 | Pehar et al. |
| 7,992,261 B2 | 8/2011 | Hammerslag et al. |
| 8,032,993 B2 | 10/2011 | Musal |
| 8,091,182 B2 | 1/2012 | Hammerslag et al. |
| 8,370,997 B2 | 2/2013 | Wright |
| 8,458,859 B2 * | 6/2013 | Degen ............... B25B 1/205 24/68 CD |
| 8,516,662 B2 | 8/2013 | Goodman et al. |
| 8,806,952 B1 * | 8/2014 | Glass ............... A63B 61/02 177/232 |
| 9,162,605 B2 | 10/2015 | Durand |
| 9,227,551 B2 | 1/2016 | Yang |
| 9,254,779 B2 * | 2/2016 | Kingery ............. B60P 7/0823 |
| 2004/0104380 A1 * | 6/2004 | Huang ............... A44B 11/125 254/218 |
| 2005/0177984 A1 * | 8/2005 | Huang ............... B60P 7/0861 24/68 CD |
| 2005/0278902 A1 * | 12/2005 | Wilcox ............... B60P 7/0861 24/68 CD |
| 2009/0047091 A1 * | 2/2009 | Huck ............... B60P 7/083 410/100 |
| 2009/0279978 A1 * | 11/2009 | Polin, Jr. ............. B65D 63/16 410/100 |
| 2009/0314122 A1 * | 12/2009 | Youn ............... B60T 7/108 74/501.5 R |
| 2011/0089284 A1 | 4/2011 | Bartolone |
| 2012/0205601 A1 * | 8/2012 | Joubert ............. B60P 7/083 254/217 |
| 2013/0111716 A1 * | 5/2013 | Squires ............. A44B 11/125 24/68 D |

FOREIGN PATENT DOCUMENTS

| | | |
|---|---|---|
| EP | 1989066 B1 | 7/2009 |
| EP | 2647533 A2 | 10/2013 |

* cited by examiner

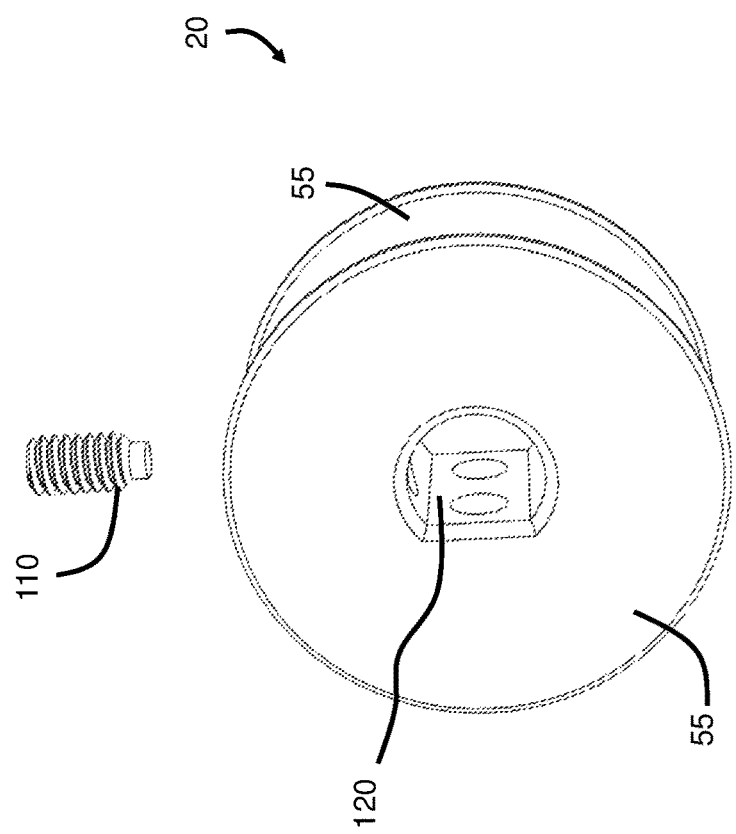
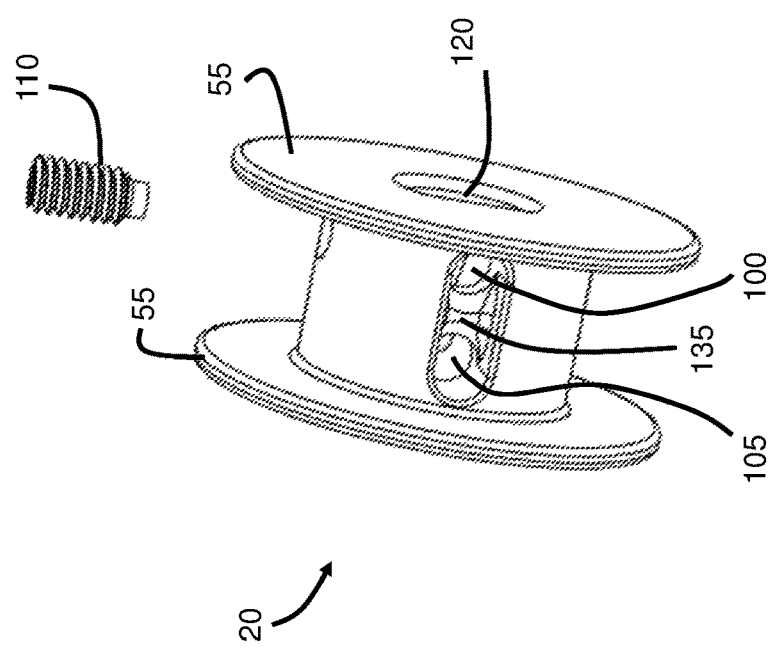

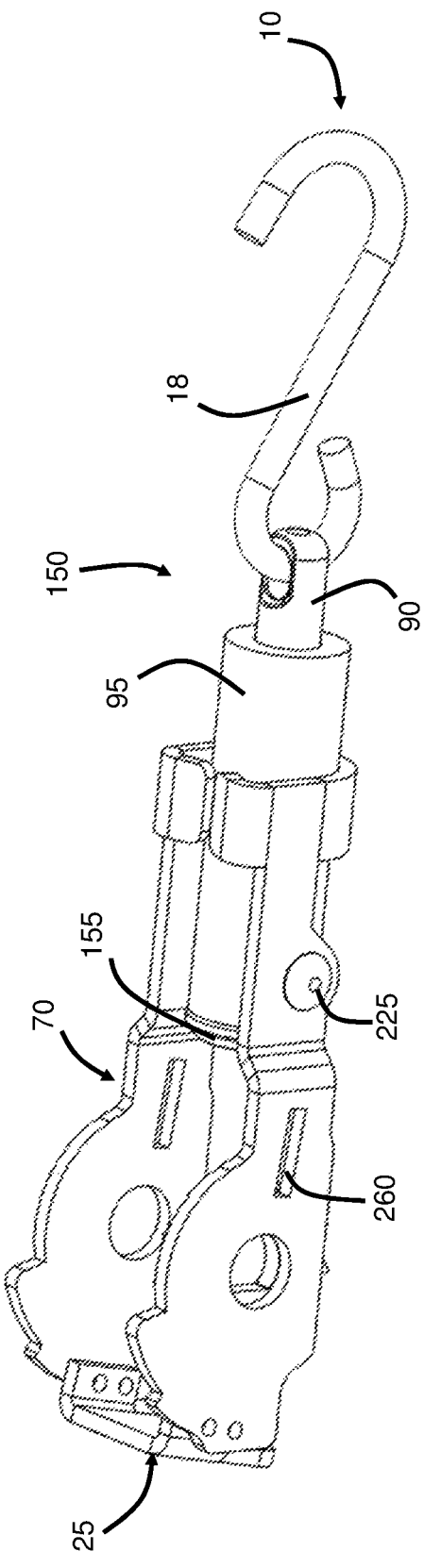
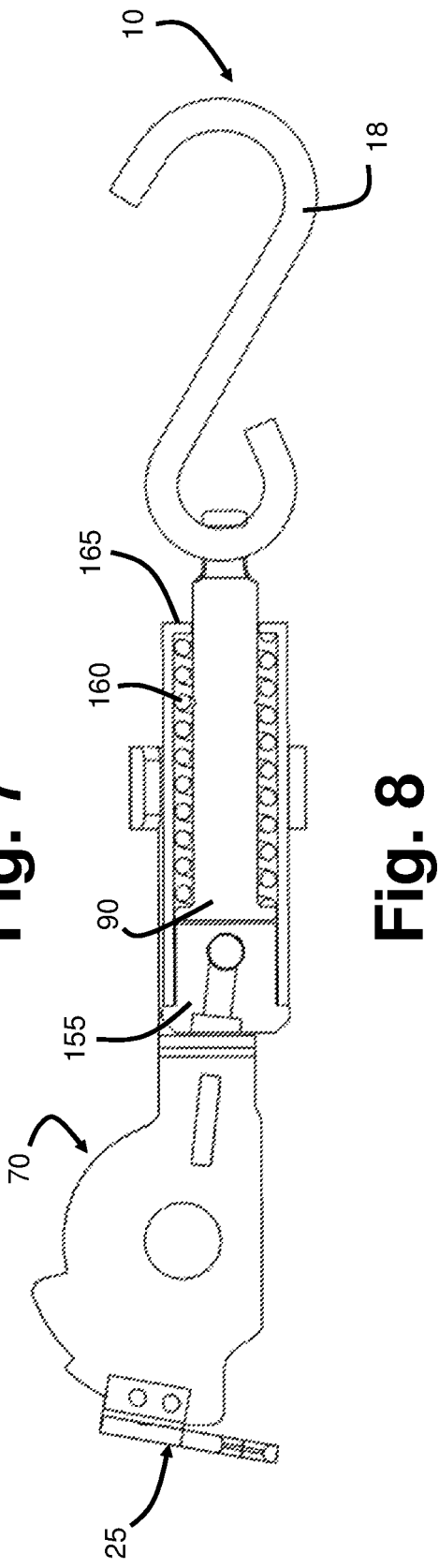
Fig. 7
Fig. 8

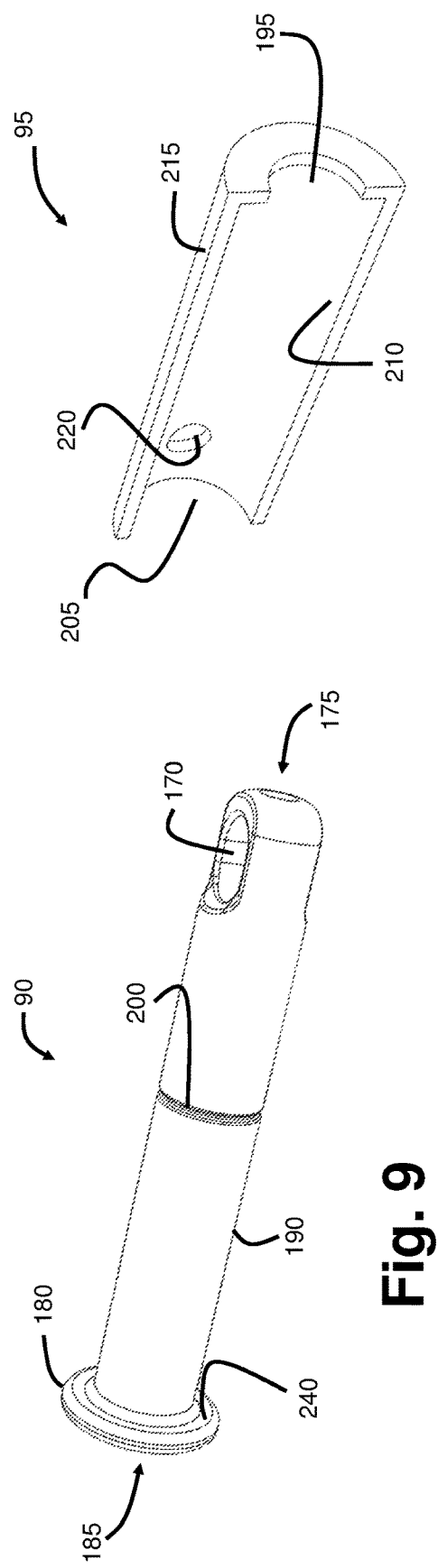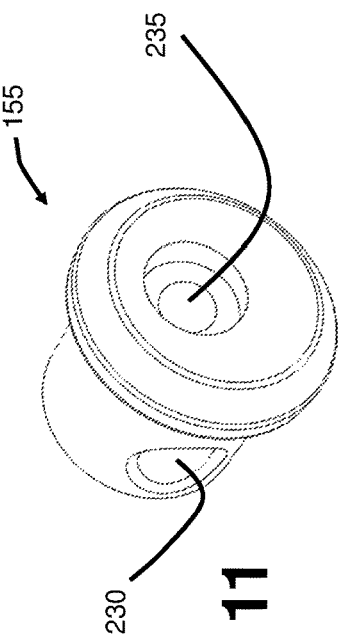

LANE LINE TENSIONING APPARATUS

CROSS-REFERENCE TO RELATED APPLICATIONS

This application claims priority to and the benefit of pending U.S. patent application Ser. No. 29/589,189 filed 29 Dec. 2016, the contents of which being hereby incorporated by reference as if fully recited herein.

TECHNICAL FIELD

Exemplary embodiments of the present invention relate generally to mechanical tensioning devices, and more specifically to ratcheting tensioning devices with an anchored line calibrated tension indicator.

BACKGROUND OF THE INVENTION

The proper tensioning of lines, cables, ropes, straps and the like has long been a subject of development for many years across many fields. Many techniques have been developed to place lines under tension for a wide variety of applications. Competitive swimming activities often require the installation and deployment of swimming pool lane lines according to internationally recognized standards such as length, width and configuration. Competition and safety standards must often be followed in the installation and maintenance of such lane lines, including attachment methods and height relative to the water's surface. FINA rules require recessed wall anchors for lane lines, floats adjacent thereto be on the surface of the water, and firmly stretched lane lines. Some applications may have tension tolerances.

Prior art swimming line tensioners typically are of two forms. One is a simple ratchet mechanism and the other an encapsulated turnbuckle device. Ratcheting devices generally are known and used to provide means for tensioning straps, cables and the like by winding the line thereby incrementally increasing the tension in the line. One common method known in the art for placing swimming lane lines under tension involves a simple ratchet system comprising a frame structure supporting a rotatable ratcheting reel secured with a locking pawl affixed to the frame. The line is passed through one end of the frame and wound about the reel, while the opposing end of the frame is attached to an anchoring point in the swimming pool. The shaft on which the ratchet reel is fixed includes a means for engaging a tool used to advance the shaft and ratchet reel in the winding direction thereby winding the lane line and increasing the tension therein. The locking pawl secures the reel against the unwinding force. Typically, a soft cover made of padded material is secured about the device to protect swimmers from inadvertent contact with sharp edges on the device.

While these simple devices effectively increase tension in the line, there still exist several disadvantages to the user. For example, the installation and adjustment of these types of devices requires the use of a tool, which can increase the time required for installation and maintenance. Furthermore, such tools can be lost easily and require separate storage. Similarly, the protective covers can be susceptible to damage or can be lost when separated from the device. Additionally, it can be difficult for a user of such devices to achieve the proper tension required for optimal and acceptable lane line deployment. This can lead to problems with improperly tensioned lane lines, severe reductions in the useful life of such lines from fatigue and inelastic stretching due to over-tensioning, or even line failure. This issue has been observed by the Applicant to be a prevalent disadvantage of prior art devices. Therefore, there exists a need in the art for a device that provides for simplified installation and maintenance procedures, as well as an ability to maintain proper tension in the line.

Another common tensioning device found in use in these applications exhibits a turnbuckle-type design, also referred to as stretching screws or bottlescrews. These devices typically comprise an elongated body with a line attachment point at one end, and screw-type turnbuckle elements at the opposite end. The inner portion of these devices provides space for a threaded eye bolt to be threaded in and out of the opposite end from the line by turning the exterior body. While these devices offer a slim profile without the need for a separate protective covering, their application requires that they be quite long relative to the ratchet-type devices. Furthermore, the adjustment process typically demands hand-turning the body of the device many times to achieve proper tension. This can be time consuming and also suffers from the disadvantage of not providing any feedback as to the proper amount of tension in the line, similarly leading to over-tightening issues as discussed above. Further still, turnbuckle devices of this type are significantly limited as to the amount of slack in the line that can be taken up, i.e., in typical applications the length of slack in the line that may be taken up corresponds to half of the length of the threaded eye bolt. Therefore, because the line to be tensioned is not wound up as is common in ratchet-type devices, any natural lengthening due to cable stretching often leads to the need to uninstall the tensioning device, shorten the line and re-install.

During a normal cable lifecycle some natural stretching is typically expected, even under optimal load conditions. None of the known devices provide feedback as to the safety bounds of elongation. Therefore, there exist deficiencies in the art wherein known devices—in addition to not adequately preventing premature elongation—do not assist the user in defining the upper bounds of safe elastic length take-up or indicate to the user that the core cabling should be replaced.

Tensioning devices exist in other applications that operate differently from basic devices employing ratchet or turnbuckle features, but none are known to provide solutions to the disadvantages presently found in the art. For example, Squires (US Pub. No. 2013/0111716) discloses a combination of these principals in a tensioning device designed to increase the tension applied through the device and to prevent theft and tampering with the device. However, the device disclosed therein requires additional drive tools to achieve proper tension and would be more difficult to install and maintain than known devices presently used in the art.

Similarly, Chance (U.S. Pat. No. 6,279,415) discloses a self-tension system ideal for use in automotive actuation cables. However, the device disclosed is difficult to install with heavy-duty cabling and high-tension situations. To provide adequate installation clearance for the associated cables, the length dimension would be too large for the intended application. Furthermore, the device does not provide a means for compensating for extensive slack from extended cable use (e.g., by reeling). The device disclosed in Chance is designed for non-maintenance situations, i.e., so that no adjustments are necessary on the part of the user. This is a purpose counter to the needs described in the swimming lane line field, as swimming lane lines are typically installed and removed for storage from a swimming pool many times, thus consistently requiring user intervention.

Glass (U.S. Pat. No. 8,806,952) discloses a device for measuring tension force on a net cord of a sports net, but is intended for integration with existing line tensioning systems such as those applied to tennis court nets. This use of this device would not overcome the disadvantages of prior art line tensioning systems, however, and further does not provide feedback on proper cable tension (rather, indicating a range of magnitudes only). Furthermore, the configuration of the device is such that the magnitude indicator is situated physically away from the means of providing cable tension, making tension maintenance more cumbersome.

It is therefore an unmet need in the prior art for an adjustable line tensioning device that provides a means for proper tension maintenance without requiring adjustment tools, that has simple installation characteristics, that provides ample adjustment tolerances, and that exhibits desirable size, profile and safety characteristics with regard to competitive standards. No known references, taken alone or in combination, are seen as teaching or suggesting the presently claimed lane line tensioning apparatus.

BRIEF SUMMARY OF THE INVENTION

Exemplary embodiments of the present disclosure pertain to a device having a ratchet assembly and a tension indicator assembly. The ratchet assembly may be provided with a handle frame and a base frame pivotally secured at a common pivot axis, wherein the handle frame and base frame are each pivotally independent with respect to the other, a reel rotatably fixed with respect to a ratchet wheel pivotally secured at the common pivot axis, wherein the reel and the ratchet wheel are pivotally independent with respect to the handle frame and the base frame, a locking pawl slidably secured to the base frame and spring-biased toward engagement with the ratchet wheel, and a driving pawl slidably secured to the handle frame and spring-biased toward engagement with the ratchet wheel, whereby rotation of the handle frame about the common pivot axis drives the rotation of the reel. The tension indicator assembly may be provided with a plunger housing secured to the base frame and having a plunger member aperture, a plunger member having a plunger cap slidably disposed within the plunger housing and a plunger shaft portion extending from the plunger cap portion through the plunger member aperture to an anchor attachment end, a plunger spring disposed inside the plunger housing between the plunger cap portion and the plunger member aperture, whereby the plunger cap portion is spring-biased away from the plunger member aperture, and a tension indicator mark on a portion of a circumference of the plunger shaft portion.

An object of the present invention is provided in devices including a shaft axially coincident with the common pivot axis. In some embodiments, the shaft is a shaft with a drive flat, D-shaft, or an otherwise keyed shaft.

An object of the present invention is provided in device embodiments wherein the reel and the ratchet wheel each further include a center bore shaped to receive the keyed shaft therein, whereby the keyed shaft, the reel and the ratchet wheel are rotatable about the common pivot axis as a unit. In some embodiments, the reel further includes a first bore and second bore connected at a common end by a contoured bridge, and the shaft further includes a first bore aligned with the first bore of the reel and a second bore aligned with the second bore of the reel. The reel may further be provided with a set screw bore oriented perpendicular to the first bore of the reel, and the shaft may further include a set screw bore aligned with the set screw bore of the reel, whereby a set screw seated within the set screw bore of the reel and the set screw bore of the shaft extends into the first bore of the shaft.

Some embodiments of the invention may include a contoured element secured to the handle frame wherein the contoured element covers an exterior surface area of the handle frame. In some configurations, the base frame may further include a pair of parallel side members extending to a first end from a second end, wherein each of the parallel side members include a bore disposed at the second end through which the shaft is seated such that the reel is positioned intermediate the parallel side members of the base frame. The handle frame may further include a pair of parallel side members extending to a first end from a second end, wherein each of the parallel side members include a bore disposed at the second end through which the shaft is seated such that the parallel side members of the base frame are positioned intermediate the parallel side members of the handle frame.

In some embodiments, the tension indicator assembly further includes a means for securing the anchor attachment end of the plunger member to an anchoring point.

An exemplary embodiment of the present invention may be provided as a device having a base frame having a pair of parallel side members extending to a first end from a second end, wherein each of the parallel side members include a bore disposed at the second end, a handle frame having a pair of parallel side members extending to a first end from a second end, wherein each of the parallel side members include a bore disposed at the second end, a shaft extending through each bore in the parallel side members of the base frame and the handle frame, whereby the base frame and the handle frame are each pivotable with respect to the other, a ratchet wheel disposed on the shaft between the pair of parallel side members of the base frame and between the pair of parallel side members of the handle frame, a locking pawl disposed intermediate the pair of parallel side members of the base frame and spring-biased toward engagement with the ratchet wheel, a driving pawl disposed intermediate the pair of parallel side members of the handle frame and spring-biased toward engagement with the ratchet wheel, a take-up reel disposed on the shaft between the pair of parallel side members of the base frame and between the pair of parallel side members of the handle frame, and a tension indicator assembly. In some embodiments, the tension indicator assembly may include a plunger housing having a first end and a second end, wherein the first end of the plunger housing includes a plunger member aperture and the second end of the plunger housing is secured to the first end of the base frame, a plunger member slidably disposed with respect to the plunger housing, the plunger member having an anchor attachment point at a first end, a plunger cap portion at a second end, and a shaft portion extending from the anchor attachment point the plunger cap portion, wherein the shaft portion is slidably disposed through the plunger member aperture and the plunger cap portion is slidably disposed only within the plunger housing, and wherein the shaft portion includes a tension indicator mark on a circumference thereof, and a plunger spring disposed about the shaft portion of the plunger member and inside of the plunger housing, thereby biasing the plunger cap portion toward the second end of the plunger housing.

It is an object of this invention to provide a line tensioning device of the type generally described herein, being adapted for the purposes set forth herein, and overcoming disadvantages found in the prior art. These and other advantages are provided by the invention described and shown in more detail below.

BRIEF DESCRIPTION OF THE SEVERAL VIEWS OF THE DRAWINGS

Novel features and advantages of the present invention, in addition to those mentioned above, will become apparent to those skilled in the art from a reading of the following detailed description in conjunction with the accompanying drawings wherein identical reference characters refer to identical parts and in which:

FIG. 5 is a further perspective view of exemplary reel elements;

FIG. 6 is a further perspective view of exemplary reel elements;

FIG. 7 is a perspective view of exemplary base frame and tension indicator assembly elements thereof;

FIG. 8 is a cross section elevation view of the view shown in FIG. 7;

FIG. 9 is a perspective view of an exemplary plunger element;

FIG. 10 is a perspective cross section view of an exemplary plunger housing;

FIG. 11 is a partial perspective view of an exemplary plunger cap element;

DETAILED DESCRIPTION OF THE INVENTION

Exemplary embodiments of the present invention are directed to a line tensioning device generally configured for attachment between an anchoring point and a line such as a steel braided cable, rope, nylon cables, or other such similar lengths of material intended to be placed under tension. Particularly in preferred exemplary embodiments of the present invention, the device may be used to anchor one end of a length of line to the end wall of a swimming pool, wherein competition swimming lane lines are typically installed to divide the pool, and to adjust the amount of tension in the lane line to achieve proper tension. Those skilled in the art will appreciate that, while in the following embodiments the specification may refer primarily to swimming lane lines being placed under tension, it will be understood that other applications of the benefits of the invention taught herein may be carried out without departing from the scope of the claims set forth below.

Figure 1:
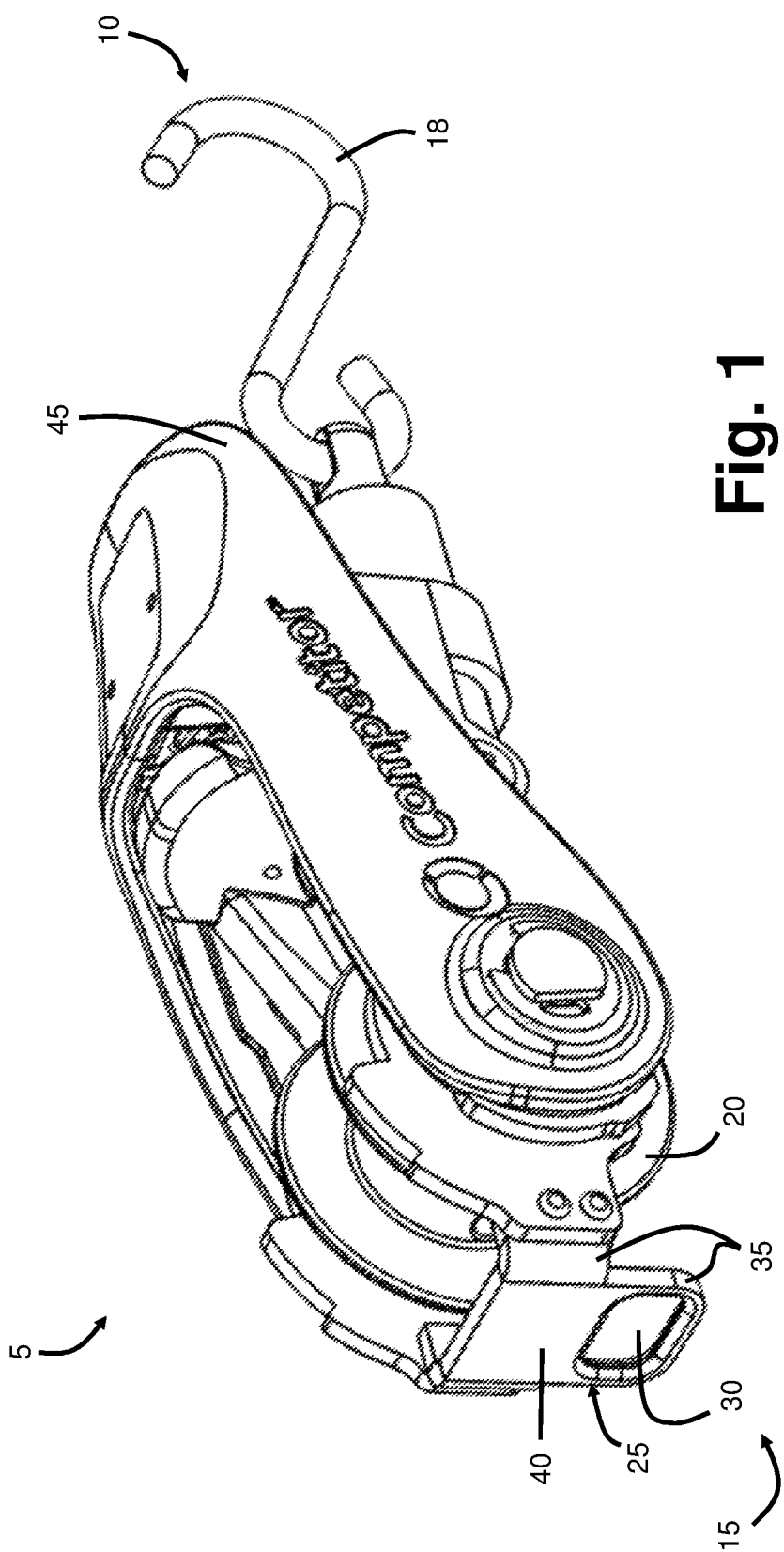
FIG. 1 is a rear perspective view of an exemplary embodiment of the invented line tensioning device in a closed position.

An exemplary embodiment of the invented line tensioning device 5 is shown in a closed position in a rear perspective view in connection with FIG. 1. Generally, the device 5 is configured linearly with a first end 10 and a second end 15. The first 10 and second 15 ends may also be referred to as anchor and line ends, respectively. The anchor, or first end 10 of the device 5 is provided with a means for attaching the device 18 to an anchoring location (not shown). In the context of swimming pool lane lines, an anchoring location may typically be a metal hook or loop embedded in the pool wall or recessed therein. In the exemplary embodiment of the device 5 shown, the anchoring means 18 is provided as an "S" hook that can be hooked onto support provided at an anchoring location. Those skilled in the art will appreciate, however, that many anchoring attachment means may be substituted with equivalent elements suitable for fixing the first end of the device with respect to an anchoring location.

The second end 15 of the device 5 is provided with a take-up reel 20, about which a free end of the line to be tensioned is secured and wound. In some embodiments, a tensioned line guide 25 is secured to the second end of the device, and includes a guide aperture 30 through which the line is passed. The tensioned line guide 25 may be included to provide protection to users, such as swimmers, operating in the vicinity of the device 5 (e.g., by introducing rounded, chamfered or beveled edges 35, or flat surfaces 40 at the extremities), and to reduce the risk of binding or line damage that may result from improper winding during usage. Similarly, preferred exemplary embodiments of the device 5 may include protective contoured elements 45 secured to the body of the device 5 to provide protection to nearby swimmers and ergonomic benefits to users.

Figure 2:
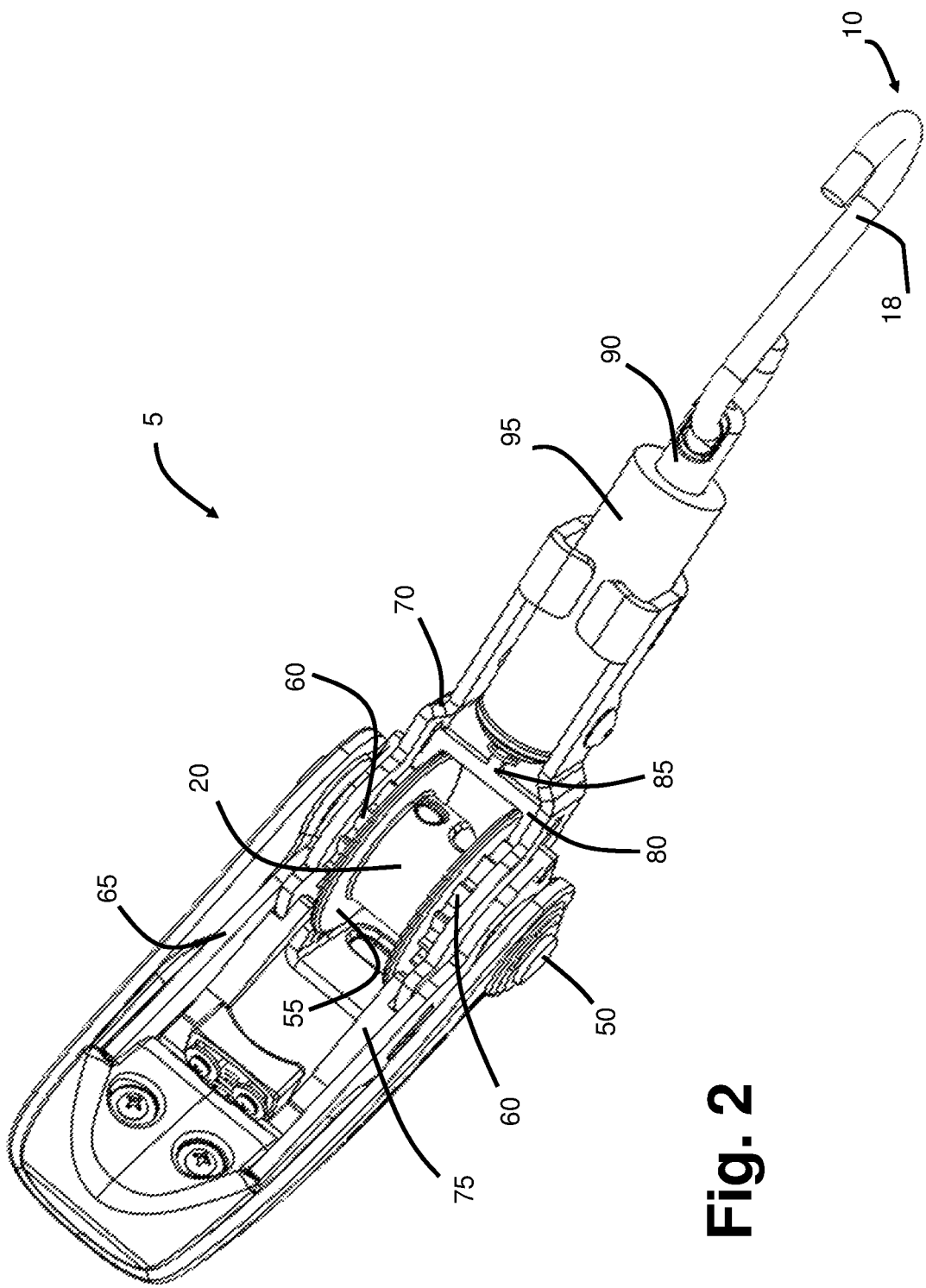
FIG. 2 is a forward perspective view thereof in an open position.

Turning to FIG. 2, a second perspective view of the device 5 is shown with the device in an open position. The invented device generally includes a ratchet assembly portion, which functionally operates to take up slack in the line being placed under tension. The ratchet assembly portion includes a take-up reel 20 disposed on a shaft 50 threaded therethrough. The take-up reel 20 may include optional side walls 55 to protect the line being wound thereon from damage or binding in connection with one or more toothed ratchet wheels 60. In a preferred embodiment, two such toothed ratchet wheels 60 are disposed on the shaft 50 on either side of the reel 20. The wheels 60 and reel 20 are disposed on the shaft intermediate two parallel side walls of a handle frame member 65, which is in turn disposed on the shaft intermediate two parallel side walls of a base frame member 70. A drive pawl 75 is slidably connected to the handle frame member 65 and is spring-biased against the ratchet wheel 60, and a locking pawl 80 is slidably connected to the base frame member 70 and is similarly spring-biased against the ratchet wheel 60. In this manner, the rotation of the handle frame member 65 about the shaft 50 and away from the base frame member 70 advances the reel 20 in step with the rotation of the ratchet wheel 60, thereby taking up slack in the connected line (not shown) and increasing its tension. In a preferred embodiment, the drive 75 and locking 80 pawls are provided in pairs of connected pawls spring-biased at a common connection point (as visible at 85 in FIG. 2).

As will be explained in further detail below, the first end 10 of the device 5 also includes a slidable plunger member 90 generally oriented axially parallel with the line under tension and within a plunger housing 95. The plunger housing 95 is fixed to or forms part of the base frame member 70 and the plunger member 90 is slidable therein, permitting linear movement of the anchoring means 15 with respect to the base frame member 70 (i.e., along the axis of the plunger member 90).

Figure 3:
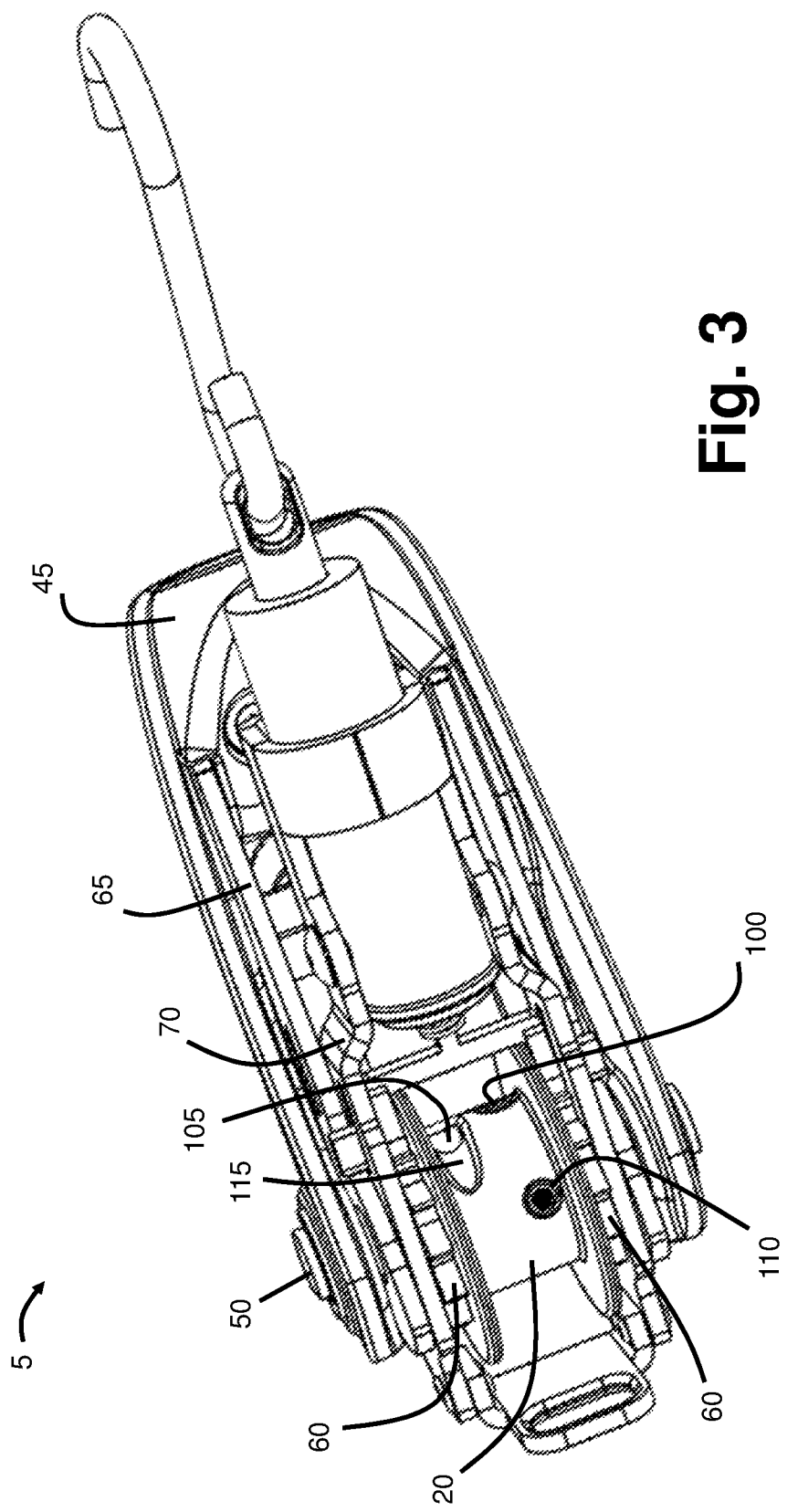
FIG. 3 is a bottom perspective view of the exemplary embodiment shown in FIG. 1.

Turning to FIG. 3, a view of the bottom of the exemplary device 5 in a closed position is shown. The protective contoured shroud 45 is shown covering and affixed to the handle frame member 65, with the base frame member 70 disposed intermediate the side walls of the handle frame member. The reel 20 is depicted in the center of the shaft 50, which extends through the handle frame member 65, base frame member 70, and ratchet wheels 60. The exemplary embodiment of the reel 20 is provided with two bores, 100 and 105. The first bore 100 provides a termination point for the line to be placed under tension, and can be fixed with a crimped endcap or similar known terminal stopper, a set screw 110 which, when tightened, clamps a portion of the line within the first bore 100, or a combination of both. The second bore 105 may be provided with a contoured exit trough 115, which provides protection against abrasion and bending of the line when placed under tension by providing a gradual change in the direction from the bore 105 to the circumference of the reel 20.

Figure 4:
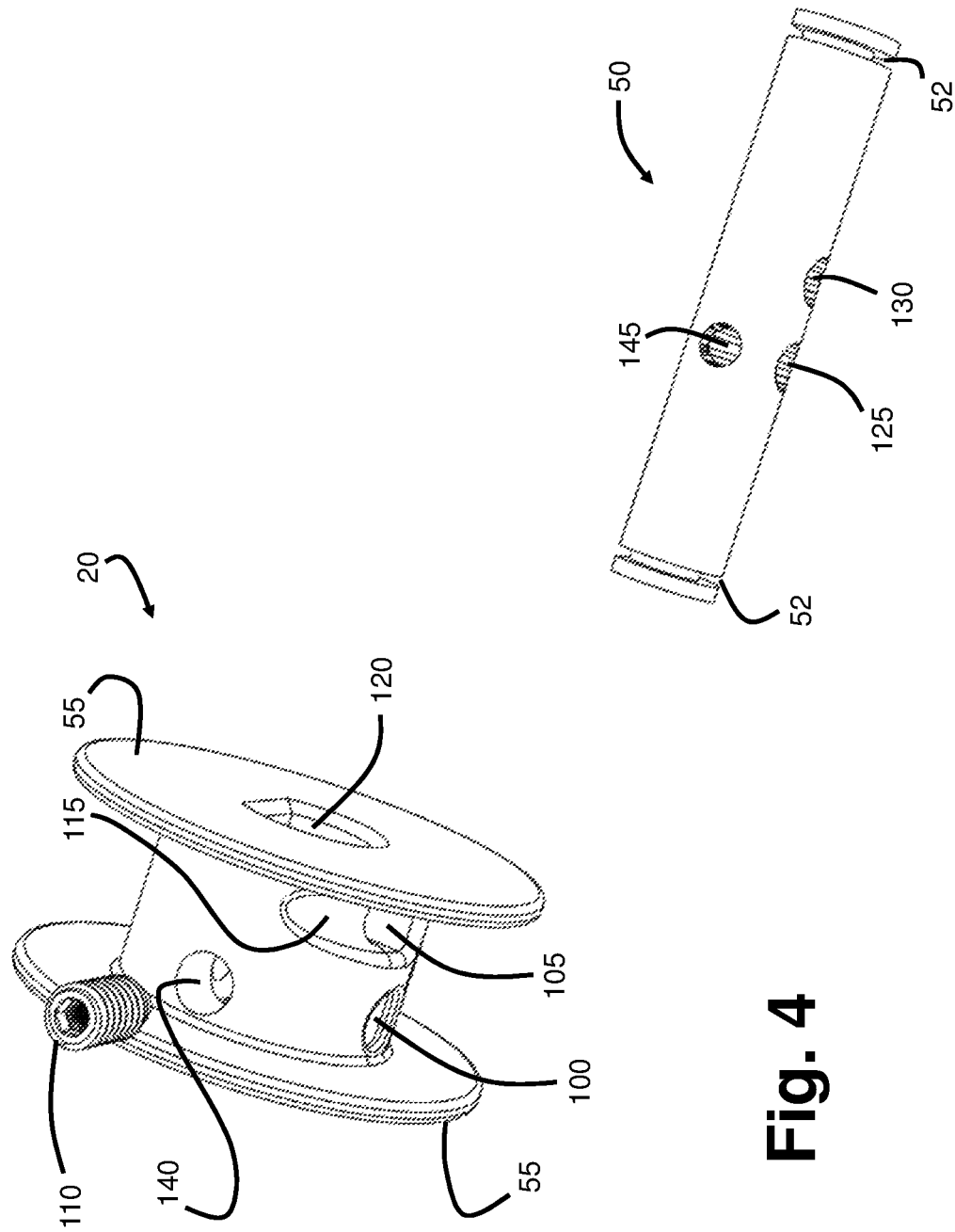
FIG. 4 is an exploded perspective view of exemplary reel and shaft elements thereof.

FIGS. 4-6 provide additional exploded detailed views of the reel 20 and set screw 110 elements in an exemplary embodiment of the invention. FIG. 4 shows an exploded perspective view of the shaft 50 element as well. When assembled, the shaft 50 extends through the center bore 120 of the reel 20, and may be secured via tapered retention rings (e.g., 54 in FIG. 12) fitted on corresponding retention grooves 52 at opposing ends of the shaft 50, or other equivalent means as will be appreciated by those skilled in the art, such as pin- or bushing-type fasteners and fittings, for instance. The shaft 50 includes first 125 and second 130 bores, which align with the first 100 and second 105 bores of the reel 20, respectively. The end of the line to be placed under tension is passed initially through the second bore 105 and around the contoured bridge 135 shown in the backside view of the reel 20 depicted in FIG. 5, and back through the first bore 100. A crimp fitting (not shown) can be secured to the end of the line, or the set screw 110 can be threaded through the reel 140 and shaft 145 set screw holes, thereby clamping the cable to the inside wall of the first shaft bore 125.

Once the line is installed on the reel 20, the trailing portion of the line may be wrapped in the exit trough 115 and around the center portion of the reel 20, in between the side walls 55. In some exemplary embodiments, the shaft 50 and center bore 120 of the reel 20 may be shaped with a cross sectional area that is noncircular, in order to fix the rotation of the shaft and reel together. In the embodiment depicted herein, for example, the shaft 50 is provided as a D-shaft, or a shaft with a drive flat, and the center bore 120 is correspondingly shaped for fit. Any equivalent keyed shaft may be used with departing from the scope of the invention. Those skilled in the art will also appreciate that, while the reel 20, shaft 50 and one or more ratchet wheels 60 may be combined into a singularly-formed part without departing from the scope of the invention or their functional operation, for manufacturing and construction ease it may be preferable to provide said elements separately.

FIGS. 7-11 depict further details of the base frame 70, the tensioned line guide 25 and the tension indicator assembly, generally at 150. FIG. 7 is a perspective partial view of an exemplary embodiment of the device, wherein the tension indicator assembly 150 is provided with a plunger housing 95, plunger cap 155, plunger 90 and anchoring means 18.

FIG. 8 is an elevation view of a cross section of FIG. 7. The tension indicator assembly 150 functionally permits linear movement of the reel (not shown) with respect to the anchored end 10 of the device, and incorporates a plunger spring 160 to provide feedback to the user with regard to proper line tension when taking up slack in the line. As the ratchet assembly is actuated to wind the line about the reel, the line tension is increased. This increase in tension compresses the plunger spring 160, causing the forward wall 165 of the plunger housing 95 to move away from the anchored end 10 of the device.

FIG. 9 is a perspective view of an embodiment of a plunger 90 in isolation, FIG. 10 is a perspective view of a cross section of an embodiment of a plunger housing 95 in isolation, and FIG. 11 is a perspective view of an embodiment of a plunger cap 155 in isolation. While this embodiment is shown having a generally circular cross sectional area, those skilled in the art will appreciate that many shapes may be employed without departing from the scope of the claims and the invention as described herein, so long as the plunger, plunger housing and plunger spring are configured in complimentary fashion. The primary purpose of the tension indicator assembly generally is to allow linear movement of the reel with respect to the anchored end of the device, and for that movement to result in feedback to the user regarding the proper line tension. As to the latter objective, an exemplary embodiment of the plunger 90 is shown having an anchor attachment point 170 at a first end 175, a plunger cap portion 180 at a second end 185, and a shaft portion 190 extending from the anchor attachment point 170 the plunger cap portion 180, wherein the shaft portion 190 is slidably disposed through a plunger member aperture 195 and the plunger cap portion 180 is slidably disposed only within the plunger housing 95.

In some embodiments, it is preferred that the shaft portion 190 of the plunger 90 includes a tension indicator mark 200 on a circumference thereof. In the exemplary embodiment shown, the tension indicator mark 200 is provided in the form of a notch formed about the circumference of the shaft portion 190 for optimal visibility. Importantly, the placement of the tension indicator mark 200 is selected with consideration of the line characteristics of the line to be placed under tension, as well as the plunger spring 160 force, such that the tension indicator mark 200 becomes visible to the user as the line tension is increased, thereby sliding the plunger 90 further out of the plunger housing 95. This feature of the invention is considered especially desirable when the device is deployed for use with standardized lines, such as competition swimming lane lines. The user of the tension indicator assembly provides a means to avoid both safety and consistency concerns that follow from over-tensioning a line, and also provide a ready means for correcting elongation during the lifespan of the line being placed under tension. Those skilled in the art will further appreciate that the particular tension indicator mark shown at 200 can take many equivalent forms, such as a paint applied to the surface of the plunger shaft portion 190, vinyl applications and other such methods used to achieve the same result. Square shafts, circular shafts and other such applicable plunger forms may also be employed without departing from the scope of the invention disclosed and claimed herein.

As those skilled in the art may appreciate, the tension indicator assembly 150 may be partially formed as part of the base frame member 70, as part of the assembly is fixed relative to the frame member. In a preferred exemplary embodiment, however, the tension indicator assembly 150 is manufactured separately from the base frame member 70 for easier assembly of the final device. Referring to FIGS. 7 and 10-11, the plunger housing 95 is provided as a hollow cylindrical member having an open end 205 and a partially open plunger member aperture 195 opposite the open end 205. The plunger housing 95 thus has inner 210 and outer 215 surfaces, and is provided with a lateral bore 220 for attachment to the base frame with fastener 225. A plunger cap 155 is inserted into the open end 205 of the plunger housing 95 and is also fixed relative to the base frame member 70 via bore 230. The cap 155 may further include a countersunk aperture 235 wherein a portion of the locking pawl connection point (e.g., 85 in FIG. 2) and locking pawl spring are seated when the device is assembled. The use of the exemplary cap 155 permits the installation of the plunger 90 through the open end 205 of the plunger housing 95, and further provides a minimum travel position (unextended or fully retracted position) for the plunger 90.

A preferred exemplary embodiment of the device is provided with a plunger spring 160 with a known spring force constant k under compression between a bottom surface 240 of the plunger cap portion 180 and the inner surface 210 of the plunger housing 95 around the plunger member aperture 195. Those skilled in the art will appreciate that there are various means of providing the compression force yielded by the exemplary plunger spring 160 that are to be deemed equivalent and within the scope of the disclosed invention and claimed herein. Preferably, the proper location of the tension indicator means 200 is calculated from some combination of the known spring force constant k, and the line length, cross section and elastic modulus.

Figure 12:
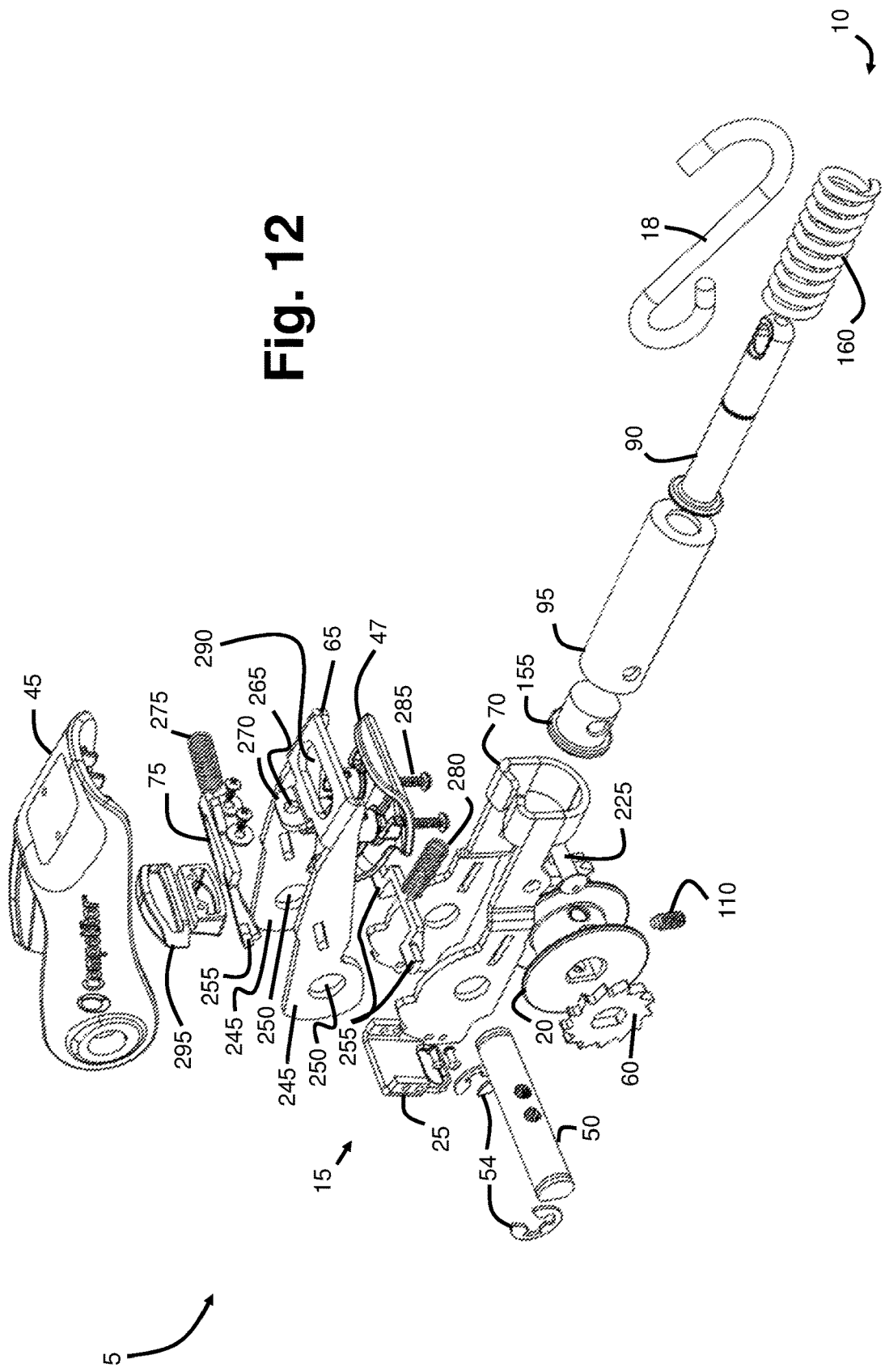
FIG. 12 is an exploded perspective view of the exemplary embodiment shown in FIG. 1.
Figure 13:
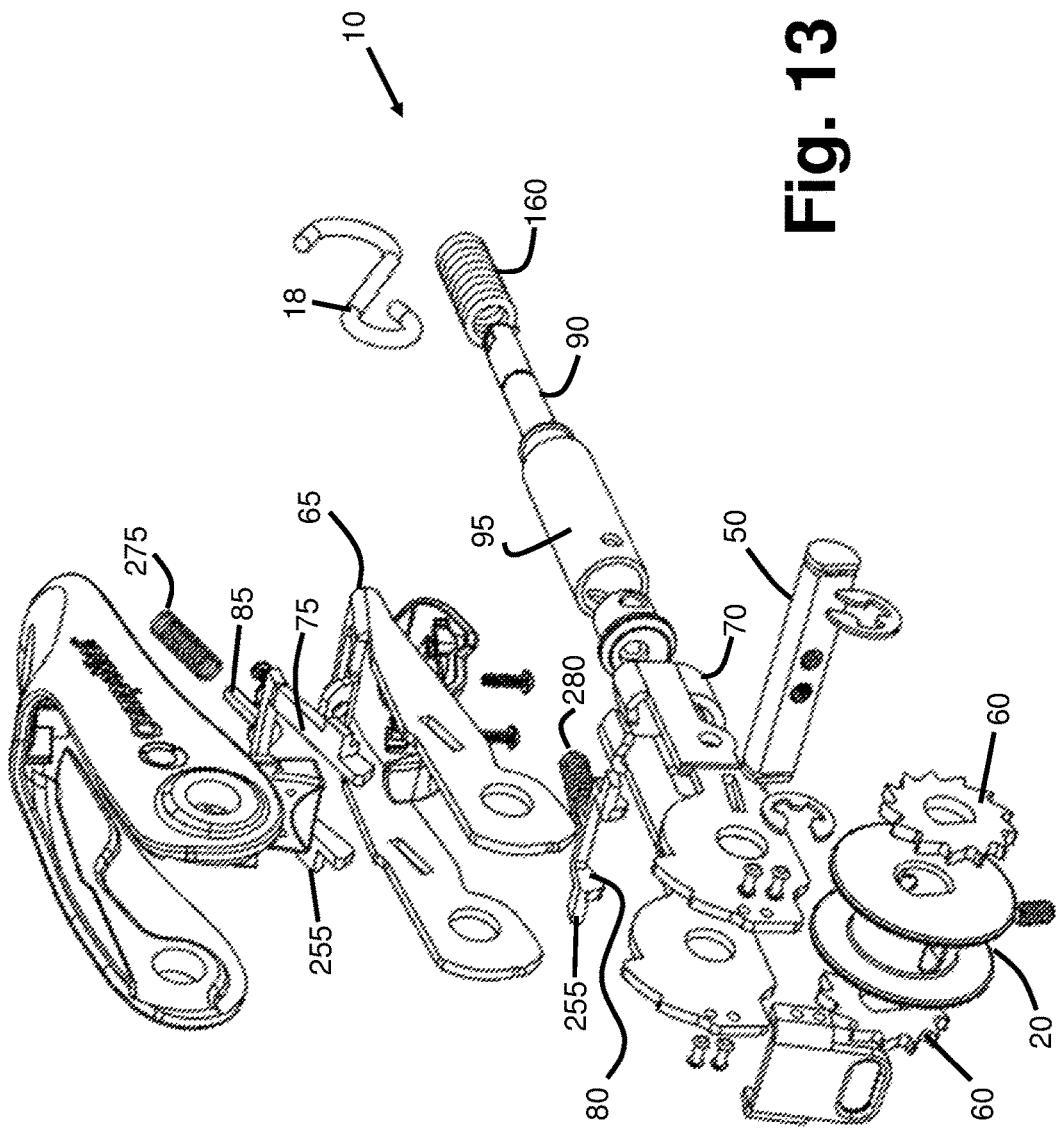
FIG. 13 is a further exploded perspective view thereof.
Figure 14:
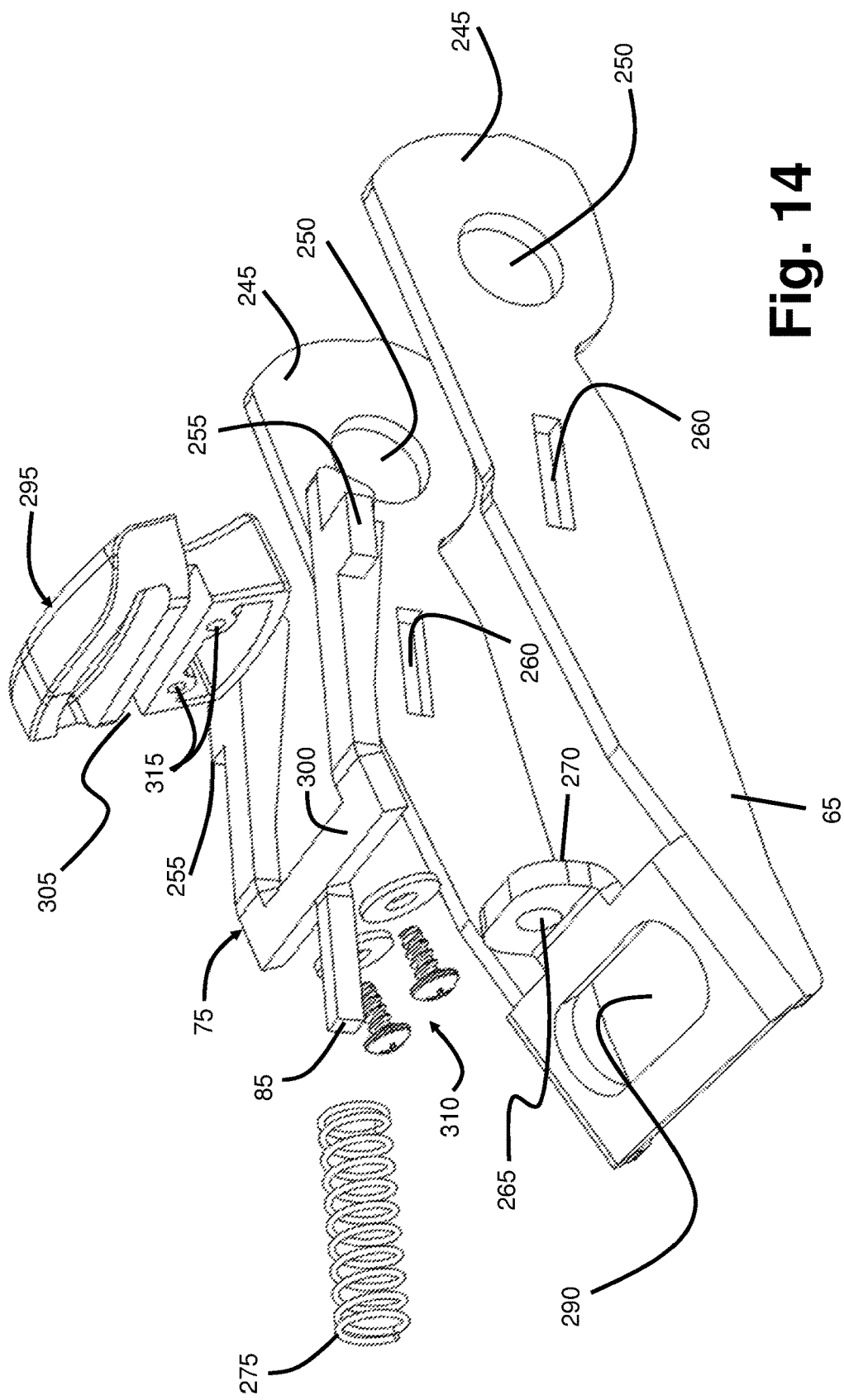
FIG. 14 is a partial exploded perspective view of exemplary handle assembly elements.
Figure 15:
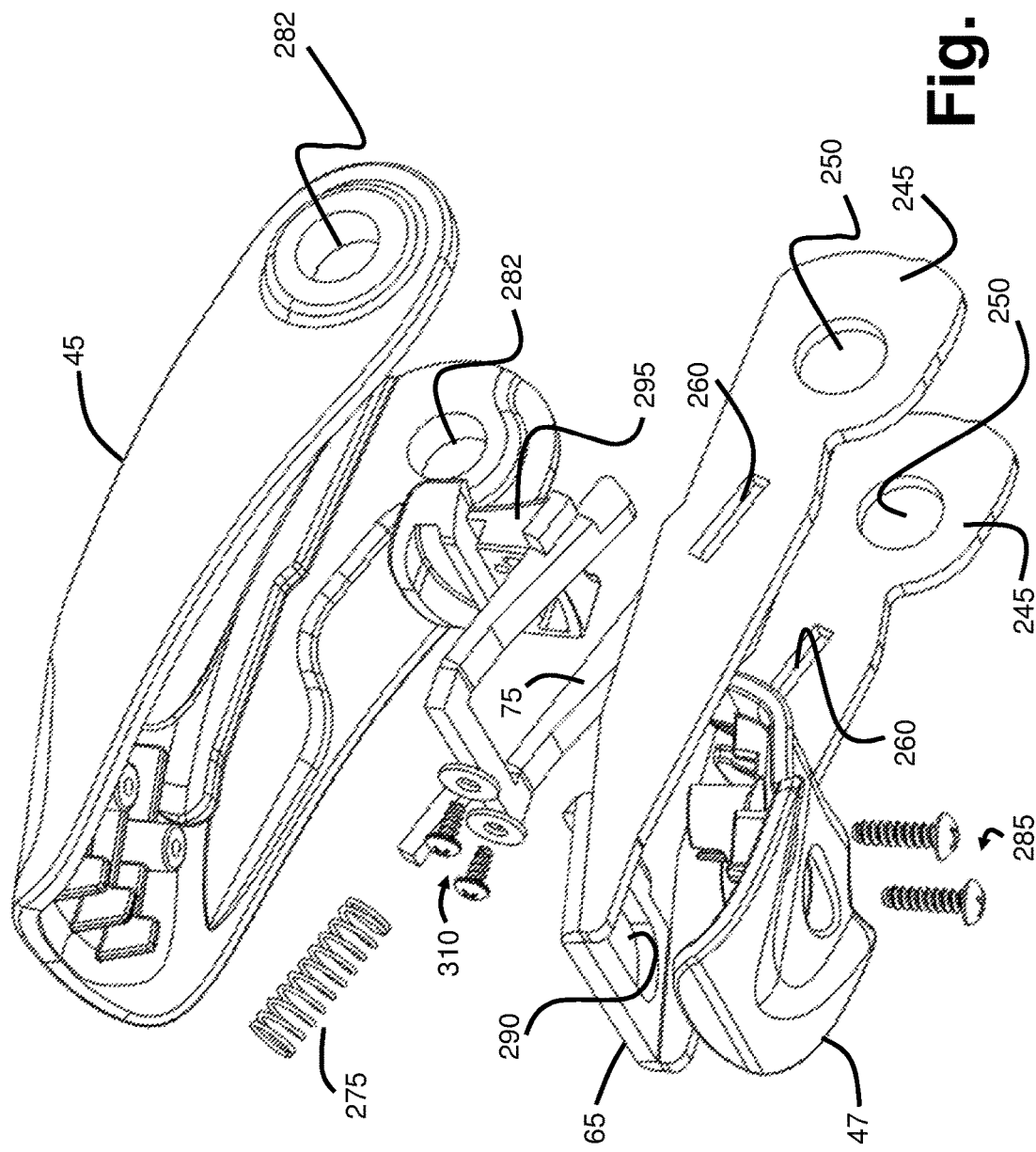
FIG. 15 is a further partial exploded perspective view of exemplary handle assembly elements.
Figure 16:
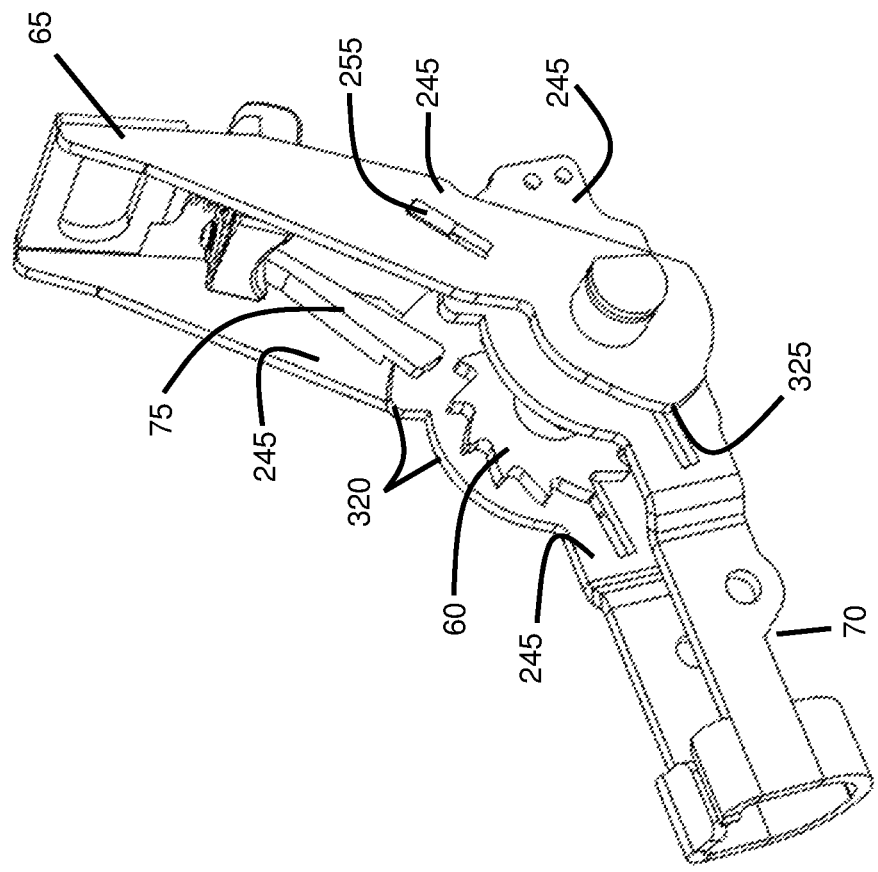
FIG. 16 is a perspective view of exemplary ratchet elements the embodiment shown in the open position in FIG. 2.

Additional features of the invented line tensioning device are depicted in connection with FIGS. 12-16. FIG. 12 is a forward perspective exploded view of an exemplary embodiment of the device 10 and FIG. 13 is a rearward perspective exploded view thereof. FIGS. 14-15 are perspective exploded views of portions of the handle assembly elements of the exemplary embodiment. FIG. 16 is a perspective partial view of the frame elements and ratchet mechanism features. An exemplary version of the handle 65 and base 70 frames are each shown having a pair of parallel side members 245 extending from a first end to a second end (in orientation generally corresponding to the first 10 and second 15 ends of the device 5), and each of the parallel side members 245 include a bore 250 disposed at the second end of the frame sized to accommodate the insertion of the shaft 50. In this embodiment shown, the shaft 50 is provided as a keyed shaft, a "D" shaft or a shaft with a drive flat. The bores 250 are provided as un-keyed or circular bores such that the rotation of the frame members 65, 70 alone do not affect the rotation of the reel 20 or ratchet wheels 60, which are locked into rotation with the shaft 50. Winding of the reel 20 is thus carried out by pivoting the handle frame 65 from a closed position to an open position, wherein the drive pawls 75 engaged the ratchet wheels 60 to rotate the shaft 50 and reel 20 by virtue of the rotation imparted to the wheels 60.

The drive pawls 75 are slidably disposed intermediate the side members 245 of the handle frame 65 and retained therein by drive pawl tabs 255 inserted into slots 260 in the handle frame 65. Similarly, the locking pawls 80 are slidably disposed intermediate the side members 245 of the base frame 70 and retained therein by locking pawl tabs 260 inserted into slots 260 in the base frame 70. Common connection points are provided as support posts 85 for each of the drive 75 and locking 80 pawls, wherein the support post for the drive pawl 75 passes through an aperture 265 in a pawl support tab 270 on the handle frame 65. The pawl is spring-biased toward the second end of the handle frame 65 by a drive pawl spring 275 through which the post 85 is threaded. Likewise, the support post for the locking pawl 80 passes by the countersunk aperture 235 as described in connection with FIG. 11, and is spring biased by a locking pawl spring 280 seated therein.

The present invention may also be provided with protective contoured elements 45, 47 for an aesthetically-pleasing look, ergonomic considerations and to provide protection from sharp edges of some of the device elements. In some embodiments, the contoured elements 45, 47 partially encapsulate the edges of the handle frame 65 and are affixed to the device by attachment via the shaft 50 seated in openings 282 and by screws 285 attaching upper and lower contoured elements via connection aperture 290 present at the first end of the handle frame 65. As shown in connection with FIG. 14 particularly, a contoured trigger element 295 may likewise be molded and adapted for seating drive pawl cross member 300 within channel 305 and fixed in place with fasteners such as screw and washer sets 310 threaded into corresponding holes 315 in the trigger element 295.

FIG. 16 illustrates a further feature of an exemplary embodiment of the invented device. In this embodiment, each of the parallel sides 245 of the base frame 70 are provided with a cam surface 320 along which a surface of the drive pawl tabs 255 slide during pivoting operation of the handle frame 65. Shown in the open position in FIG. 16, the profile of the cam surface 320 is such that the drive pawl tabs 255 are forced to the forward end of the slots 260, thereby disengaging the drive pawl 75 from the ratchet wheels 60. Similarly, each of the parallel sides 245 of the handle frame 65 are provided with a cam surface 325 along which a surface of the tabs 255 on the locking pawl 80 (not shown in FIG. 16 for clarity—see FIGS. 12-13) slide during pivoting operation of the handle frame 65. The profile of the base frame 70 cam surface 325 is such that, in the extreme open position, the locking pawl is moved away from the ratchet wheels 60, thereby allowing the reel 20 and ratchet wheels 60 to rotate freely. Typically, this position permits a user to easily let out slack in the line, or to disengage the device from the line for storage, if desired.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:
1. A device comprising:
 a ratchet assembly comprising:
  a handle frame and a base frame pivotally secured at a common pivot axis, wherein the handle frame and base frame are each pivotally independent with respect to the other;
  a reel rotatably fixed with respect to a ratchet wheel pivotally secured at the common pivot axis, wherein the reel and the ratchet wheel are pivotally independent with respect to the handle frame and the base frame;
a locking pawl slidably secured to the base frame and spring-biased toward engagement with the ratchet wheel; and
a driving pawl slidably secured to the handle frame and spring-biased toward engagement with the ratchet wheel, whereby rotation of the handle frame about the common pivot axis drives the rotation of the reel; and
a tension indicator assembly comprising:
  a plunger housing secured to the base frame and having a plunger member aperture;
  a plunger member having a plunger cap slidably disposed within the plunger housing and a plunger shaft portion extending from the plunger cap portion through the plunger member aperture to an anchor attachment end;
  a plunger spring disposed inside the plunger housing between the plunger cap portion and the plunger member aperture, whereby the plunger cap portion is spring-biased away from the plunger member aperture; and
  a tension indicator mark on a portion of a circumference of the plunger shaft portion.

2. The device of claim 1 further comprising a shaft axially coincident with the common pivot axis.

3. The device of claim 2 wherein the shaft is a keyed shaft.

4. The device of claim 3 wherein the reel and the ratchet wheel each further comprise a center bore shaped to receive the keyed shaft therein, whereby the keyed shaft, the reel and the ratchet wheel are rotatable about the common pivot axis as a unit.

5. The device of claim 4 wherein:
the reel further comprises a first bore and second bore connected at a common end by a contoured bridge; and
the shaft further comprises a first bore aligned with the first bore of the reel and a second bore aligned with the second bore of the reel.

6. The device of claim 5 wherein:
the reel further comprises a set screw bore oriented perpendicular to the first bore of the reel; and
the shaft further comprises a set screw bore aligned with the set screw bore of the reel, whereby a set screw seated within the set screw bore of the reel and the set screw bore of the shaft extends into the first bore of the shaft.

7. The device of claim 1 further comprising a contoured element secured to the handle frame wherein the contoured element covers an exterior surface area of the handle frame.

8. The device of claim 6 wherein:
the base frame further comprises a pair of parallel side members extending to a first end from a second end, wherein each of the parallel side members include a bore disposed at the second end through which the shaft is seated such that the reel is positioned intermediate the parallel side members of the base frame; and
the handle frame further comprises a pair of parallel side members extending to a first end from a second end, wherein each of the parallel side members include a bore disposed at the second end through which the shaft is seated such that the parallel side members of the base frame are positioned intermediate the parallel side members of the handle frame.

9. The device of claim 1 wherein the tension indicator assembly further comprises a means for securing the anchor attachment end of the plunger member to an anchoring point.

10. A device comprising:
a base frame having a pair of parallel side members extending to a first end from a second end, wherein each of the parallel side members include a bore disposed at the second end;
a handle frame having a pair of parallel side members extending to a first end from a second end, wherein each of the parallel side members include a bore disposed at the second end;
a shaft extending through each bore in the parallel side members of the base frame and the handle frame, whereby the base frame and the handle frame are each pivotable with respect to the other;
a ratchet wheel disposed on the shaft between the pair of parallel side members of the base frame and between the pair of parallel side members of the handle frame;
a locking pawl disposed intermediate the pair of parallel side members of the base frame and spring-biased toward engagement with the ratchet wheel;
a driving pawl disposed intermediate the pair of parallel side members of the handle frame and spring-biased toward engagement with the ratchet wheel;
a take-up reel disposed on the shaft between the pair of parallel side members of the base frame and between the pair of parallel side members of the handle frame; and
a tension indicator assembly, comprising:
  a plunger housing having a first end and a second end, wherein the first end of the plunger housing includes a plunger member aperture and the second end of the plunger housing is secured to the first end of the base frame;
  a plunger member slidably disposed with respect to the plunger housing, the plunger member having an anchor attachment point at a first end, a plunger cap portion at a second end, and a shaft portion extending from the anchor attachment point to the plunger cap portion, wherein the shaft portion is slidably disposed through the plunger member aperture and the plunger cap portion is slidably disposed only within the plunger housing, and wherein the shaft portion includes a tension indicator mark on a circumference thereof; and
  a plunger spring disposed about the shaft portion of the plunger member and inside of the plunger housing, thereby biasing the plunger cap portion toward the second end of the plunger housing.

11. The device of claim 10 wherein the pair of parallel side members of the base frame are positioned intermediate the pair of parallel side members of the handle frame.

12. The device of claim 10 wherein the shaft is a keyed shaft.

13. The device of claim 12 wherein the reel and the ratchet wheel each further comprise a center bore shaped to receive the keyed shaft therein, whereby the keyed shaft, the reel and the ratchet wheel rotate together.

14. The device of claim 5 wherein:
the reel further comprises a first bore and second bore connected at a common end by a contoured bridge; and
the shaft further comprises a first bore aligned with the first bore of the reel and a second bore aligned with the second bore of the reel.

15. The device of claim 14 wherein:
the reel further comprises a set screw bore oriented perpendicular to the first bore of the reel; and
the shaft further comprises a set screw bore aligned with the set screw bore of the reel, whereby a set screw seated within the set screw bore of the reel and the set screw bore of the shaft extends into the first bore of the shaft.

16. The device of claim 15 further comprising a contoured element secured to the handle frame wherein the contoured element covers an exterior surface area of the handle frame.

17. The device of claim 10 wherein the tension indicator assembly further comprises a means for securing the anchor attachment end of the plunger member to an anchoring point.

* * * * *